US005435398A

United States Patent [19]

Juan

[11] Patent Number: 5,435,398

[45] Date of Patent: Jul. 25, 1995

[54] ELECTRICAL WRENCH

[75] Inventor: Chih-Chen Juan, Tainan Hsien, Taiwan

[73] Assignee: Chiu-Yu Wang Cheng, Chia-Yi City, Taiwan

[21] Appl. No.: 299,574

[22] Filed: Sep. 1, 1994

[51] Int. Cl.[6] .......................... B23Q 5/00

[52] U.S. Cl. .......................... 173/176; 173/93.5; 173/93

[58] Field of Search .......................... 173/95, 93, 93–95, 173/122, 124, 205, 176, 109

[56] References Cited

U.S. PATENT DOCUMENTS

| | | | |
|---|---|---|---|
| 2,784,819 | 3/1957 | Reynolds | 173/93.5 |
| 3,605,914 | 9/1971 | Kramer | 173/93 |
| 4,583,600 | 4/1986 | Smith, III | 173/124 |
| 4,947,939 | 8/1990 | Hung | 173/93 |
| 5,379,851 | 1/1995 | Huang | 173/93 |

*Primary Examiner*—Scott A. Smith

*Attorney, Agent, or Firm*—Knobbe, Martens, Olson & Bear

[57] ABSTRACT

An electrical wrench includes a motor and a drive shaft driven by the motor. A transmission body is mounted on the drive shaft for rotating synchronously therewith and has an accommodating space. A wrench shaft has a follower member extending into the accommodating space. A swing member has an axial positioning protrusion and is pivoted within the accommodating space about an axis offset and parallel to the axis of rotation of the transmission body. The swing member can swing to an engaging position with the follower member to transmit rotation when the transmission body is rotated to a high speed. A shoe assembly is biased to clamp the swing member to disengage the swing member from the follower member and releases the swing member to the engaging position by virtue of the centrifugal force induced at the high speed of the transmission body. The shoe assembly includes a pair of shoes which extend circumferentially on two sides of the swing member and which respectively have one end pivoted within the accommodating space and the other opposite end that can clamp and immobilize the positioning protrusion.

4 Claims, 5 Drawing Sheets

ELECTRICAL WRENCH

BACKGROUND OF THE INVENTION

1. Field of the Invention

This invention relates to an electrical wrench, more particularly to an electrical wrench which utilizes a fewer number of elements and which can be operated conveniently and effectively to tighten or loosen a workpiece.

2. Description of the Related Art

Generally speaking, a conventional electrical wrench is a tool which uses a motor as a power source and which is applied to tighten or loosen a workpiece, such as the wheel nuts of vehicles.

The conventional electrical wrench 1, as shown in FIG. 1, is mounted within a housing (not shown) and includes a motor 10, a transmission body 11, a transmission member 12, a drive shaft 13, a wrench shaft 14, a swing member 16 of substantially segmented annulus-shape, and a shoe assembly 2.

The motor 10 is a reversible motor for selectively tightening or loosening a workpiece.

The transmission body 11 includes two axially spaced front and rear annular walls 110, 111 which respectively have axial holes 112, 113 formed therethrough and which are connected securely to each other so as to cooperatively define an accommodating space 115 therebetween. A circular tube 114 projects rearwardly from the center section of the rear annular wall 111 and is communicated with the axial hole 113 of the rear annular wall 111.

The drive shaft 13 is disposed within the accommodating space 115 and has a front end portion 133 with a space in an end surface thereof and a rear end portion 132 which extends through the axial hole 113 of the rear annular wall 111 and the circular tube 114 and which is to be connected to an output shaft 101 of the motor 10 so that the drive shaft 13 can be driven by the motor 10. A lock element 134 is sleeved fixedly on the rear end portion 132 of the drive shaft 13 so as to position the drive shaft 13 on the motor 10.

The transmission member 12 is sleeved on the drive shaft 13 within the accommodating space 115 for rotating synchronously with the drive shaft 13, and has a slot 121 formed in a circumferential section thereof.

The wrench shaft 14 has an end portion which extends through the axial hole 112 of the front annular wall 110 into the space of the front end portion 133 of the drive shaft 13 so that the wrench shaft 14 is rotatable freely relative to the drive shaft 13. A follower member 141 is mounted securely on the wrench shaft 14 and is located within the accommodating space 115, as shown in FIG. 2.

The swing member 16 is mounted pivotally on an axial rod 15 which extends between the front and rear annular walls 110, 111 along an axis, the axis being offset and parallel to the axis of rotation of the transmission body 11. The swing member 16 has an extension member 161, as shown in FIG. 1, which is engageable with the slot 121 of the transmission member 12 so that the swing member 16 can rotate synchronously with the transmission member 12 by virtue of rotation of the drive shaft 13. In this way, the swing member 16 can rotate the transmission body 11 via the axial rod 15. A compression spring 131 is sleeved on the drive shaft 13 between the follower member 141 and the transmission member 12 (see FIG. 2) for biasing the transmission member 12 toward the rear annular wall 111 so as to permit disengagement of the transmission member 12 from the swing member 16, as shown in FIG. 3. Accordingly, the swing member 16 can swing to an engaging position so as to permit engagement of two wing-like parts 162 of the swing member 16 with the follower member 141 and to transmit rotation to the wrench shaft 14, thereby tightening or loosening a workpiece.

Referring again to FIG. 2, the shoe assembly 2 is sleeved on the circular tube 114 of the transmission body 11 for rotating synchronously with the transmission body 11. A lock member 20 is sleeved fixedly on the circular tube 114 outside the shoe assembly 2 so as to prevent removal of the shoe assembly 2 away from the circular tube 114. The shoe assembly 2 is capable of pushing the transmission member 12 to engage the swing member 16 so as to disengage two wing-like parts 162 of the swing member 16 from the follower member 141, thereby stopping rotation of the wrench shaft 14.

Referring again to FIGS. 1 and 2, the shoe assembly 2 includes a main body 21 (see FIG. 1) which is sleeved on the circular tube 114 of the transmission body 11 for rotating synchronously with the transmission body 11. Two pairs of aligned pivot slots 212 (see FIG. 2) are formed through two opposite side walls 211 of the main body 21. Each pair of the aligned pivot slots 212 allows a pivot bar 22 to extend therethrough. The end portions of the pivot bars 22, which protrude from each side wall 211, are connected each other by a respective spring 23 so that the springs 23 can bias the pivot bars 22 toward each other. Two push members 24 are mounted respectively and rotatably on the pivot bars 22. Each of the push members 24 has two push arms 241. When the springs 23 pull the pivot bars 22 toward each other, the push arms 241 can push a disc 25, that is sleeved on the circular tube 114, toward the rear annular wall 111 so as to push several pins 17 via holes 117 of the rear annular wall 11 into the accommodating space 115. In this way, the pushing force of the pins 17 can overcome the biasing force of the compression spring 131 to push the transmission member 12 to engage the extension member 161 of the swing member 16 so as to allow disengagement of the wing-like parts 162 of the swing member 16 from the follower member 141, thereby stopping rotation of the wrench shaft 14. Each of the push members 24 further has a weighing member 26 mounted thereon. When the transmission body 11 is rotated to a predetermined high speed, the weighing members 26, under the influence of centrifugal force, are arranged to overcome the force of the springs 23 so as to move the pivot bars 22 in opposite directions away from rotational axis of the transmission body 11, as shown in FIG. 3. At this time, the push members 24 are turned about the pivot bars 22 so as to allow the push arms 241 to be turned to the interior of the shoe assembly 2. In this way, the compression spring 131 can bias the transmission member 12 to the rear annular wall 111 so as to disengage the transmission member 12 from the swing member 16. Accordingly, the swing member 16 can swing to the engaging position so as to allow the wing-like parts 162 of the swing member 16 to engage the follower member 141, thereby actuating the wrench shaft 14.

Because the conventional electrical wrench requires a large number of elements as described above, it is quite difficult to combine these elements to constitute the conventional electrical wrench. In addition, owing to the complicated combination of the elements of the conventional electrical wrench, especially the shoe assembly 2, the conventional electrical wrench has a relatively high manufacturing cost and breaks down easily during long-term use. Of course, it is not easy to repair the conventional electrical wrench due to the complicated construction of the conventional electrical wrench.

SUMMARY OF THE INVENTION

Therefore, the main objective of this invention is to provide an electrical wrench which utilizes a fewer number of elements and which can be operated conveniently and effectively to tighten or loosen a workpiece.

According to this invention, an electrical wrench includes a motor, a drive shaft, a transmission body, a wrench shaft, a swing member of substantially segmented annulus-shape, and a shoe assembly.

The drive shaft is driven by the motor. The transmission body is mounted on the drive shaft for rotating synchronously therewith and has an accommodating space. The wrench shaft has a follower member at one end thereof. The follower member extends into the accommodating space of the transmission body. The swing member has an axially extending positioning protrusion and is mounted pivotally within the accommodating space of the transmission body about an axis offset and parallel to the axis of rotation of the transmission body. The axially extending positioning protrusion has a circular cross section. The swing member further includes a diametrical cross pin which projects from two sides of the axially extending positioning protrusion. The swing member normally swings to an engaging position with the follower member to transmit rotation to the wrench shaft when the transmission body is rotated to a predetermined high speed.

The shoe assembly can be biased to clamp the swing member to disengage the swing member from the follower member and can release the swing member to the engaging position by virtue of the centrifugal force induced at the predetermined high speed of the transmission body. The shoe assembly includes a pair of shoes of substantially segmented annulus-shape which extend circumferentially on two sides of the swing member, and which respectively have one end mounted pivotally to the transmission body in the accommodating space. The shoes have the other opposite ends which are normally biased to abut against each other to their clamping positions and which are recessed to cooperatively define a receiving space that substantially conforms to the shape of the axially extending positioning protrusion and the diametrical cross pin. Accordingly, the other opposite ends of the shoes can clamp and immobilize the axially extending positioning protrusion and the diametrical cross pin of the swing member when the shoe assembly is biased to clamp the swing member so as to disengage the swing member from the follower member, thereby stopping rotation of the wrench shaft.

BRIEF DESCRIPTION OF THE DRAWINGS

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
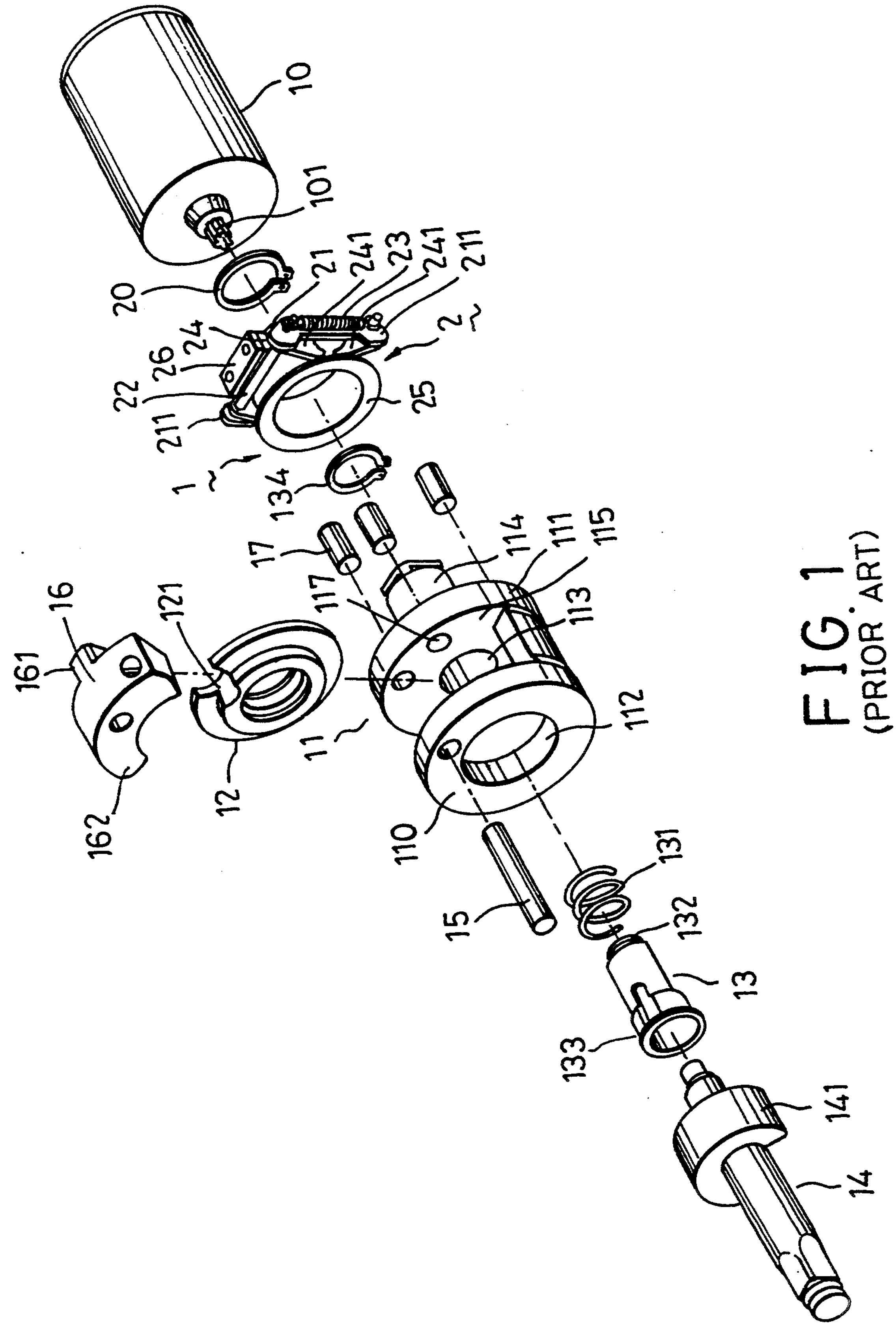
FIG. 1 (PRIOR ART)
FIG. 1 is an exploded view of a conventional electrical wrench.
Figure 2:
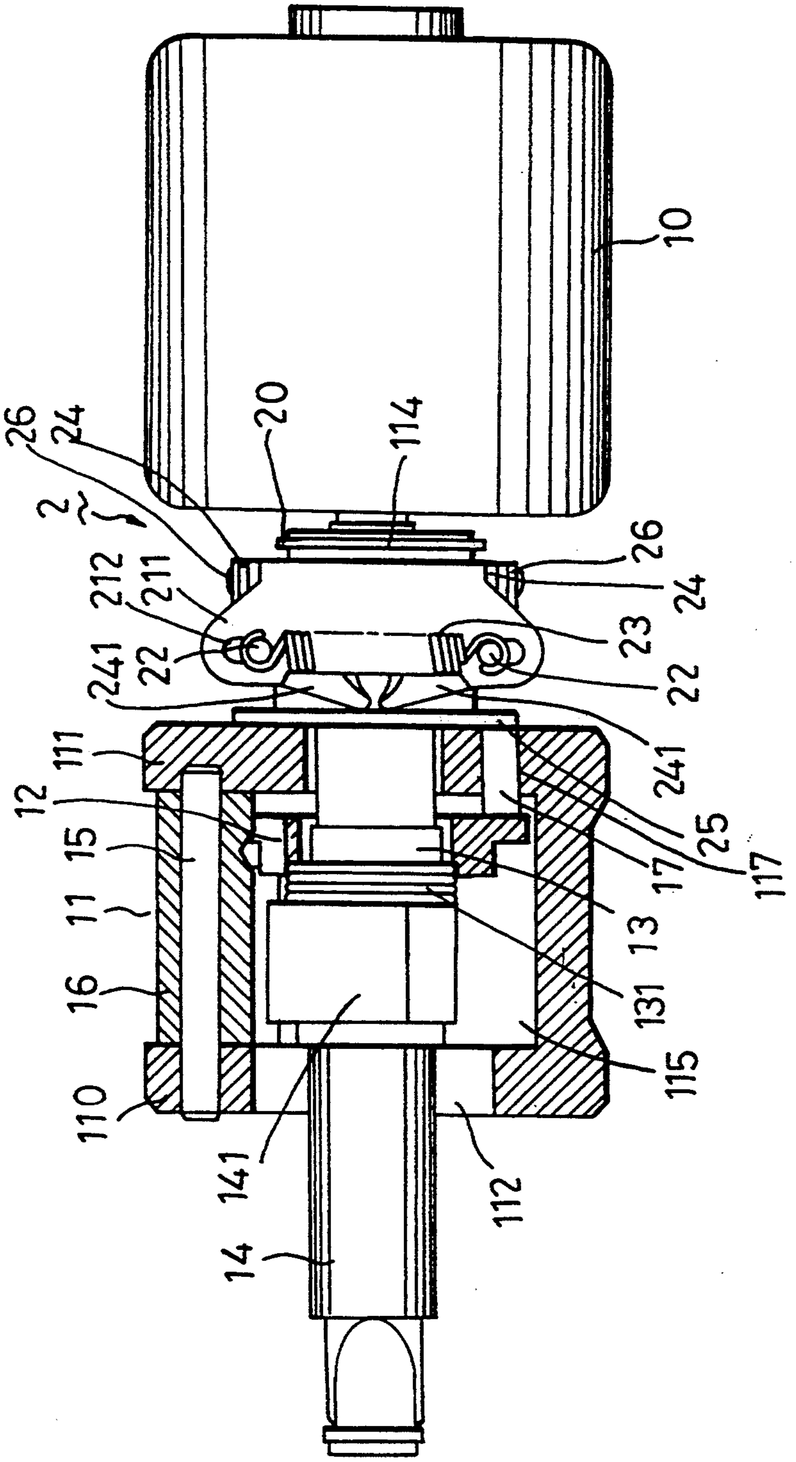
FIG. 2 (PRIOR ART)
FIG. 2 is a sectional view showing the conventional electrical wrench.
Figure 3:
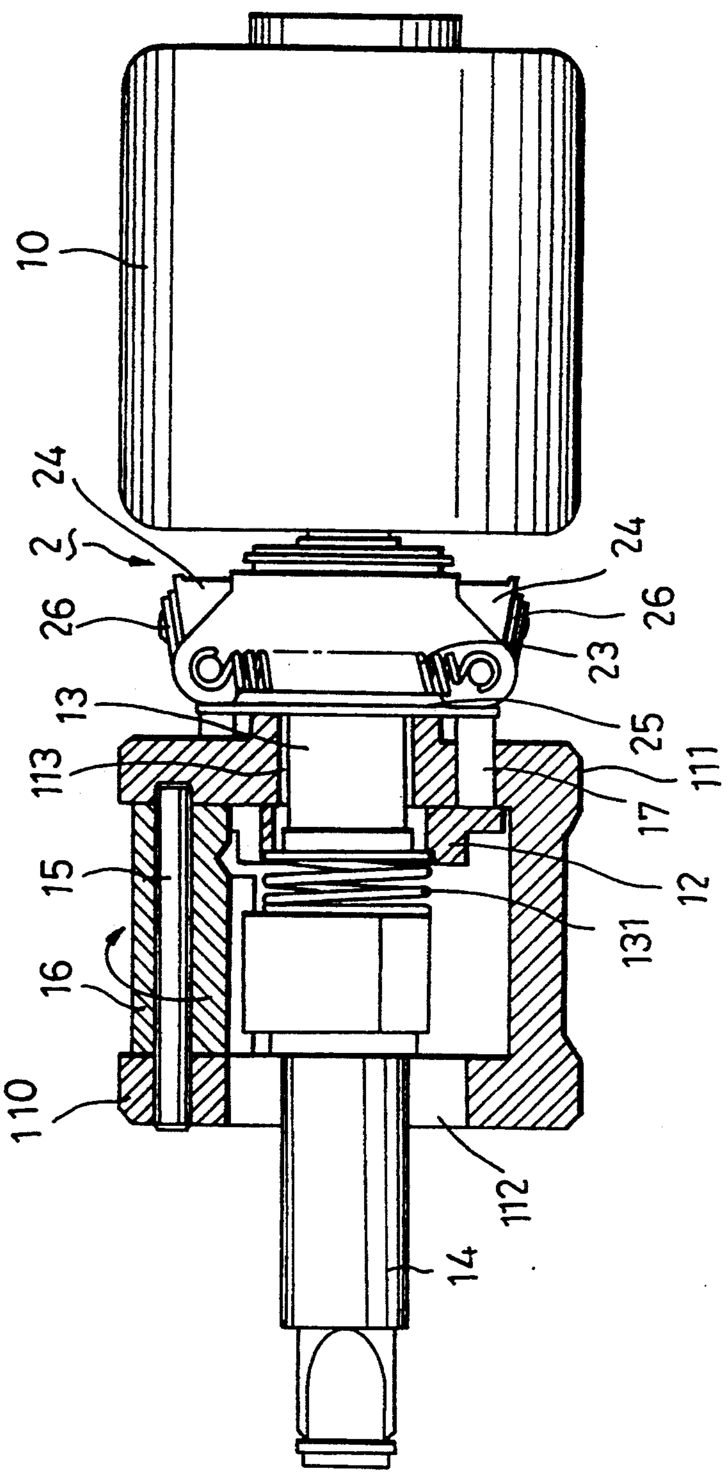
FIG. 3 (PRIOR ART)
FIG. 3 is a schematic view illustrating the conventional electrical wrench.
Figure 4:
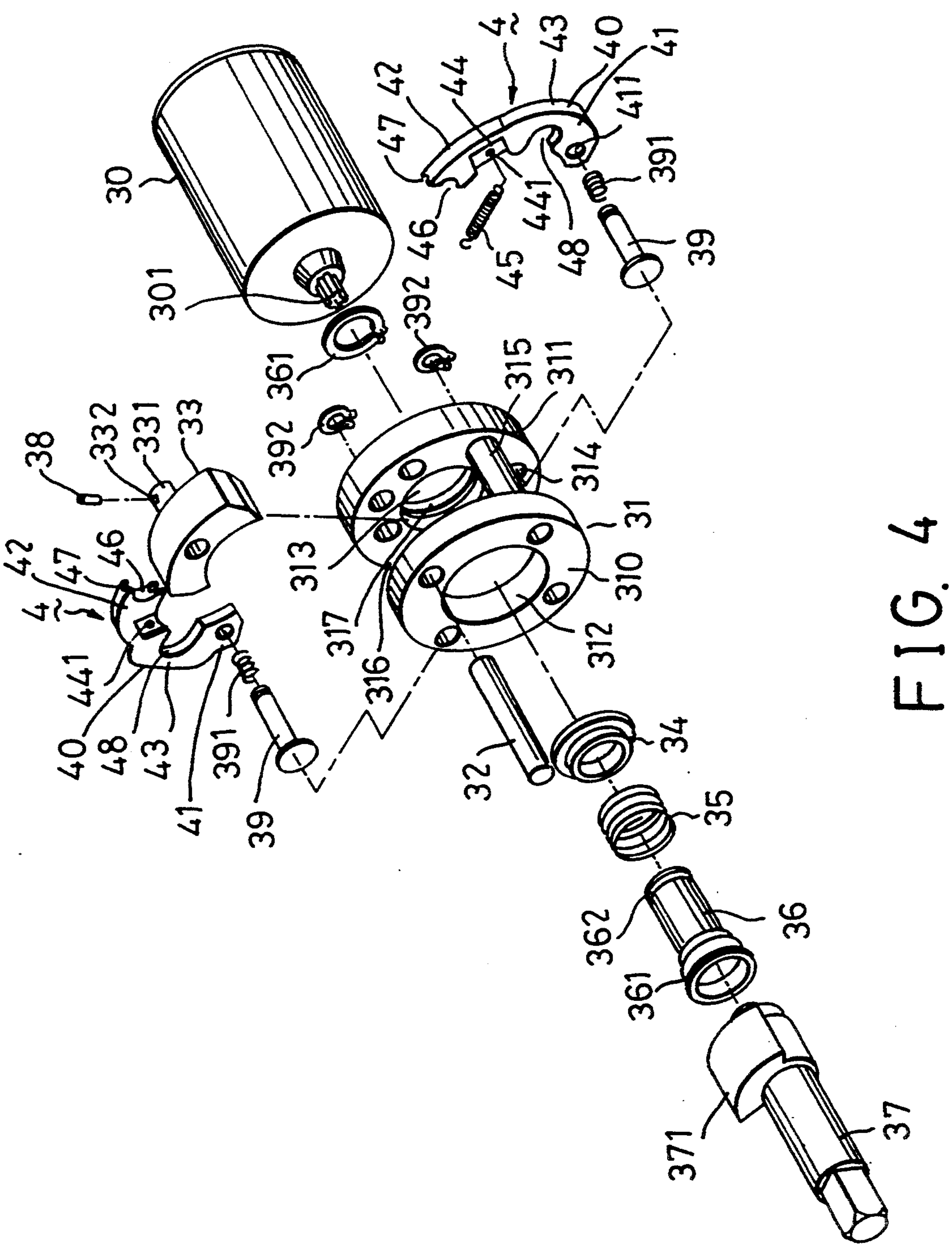
FIG. 4 is an exploded view showing an electrical wrench according to the preferred embodiment of this invention.

Referring to FIG. 4, the preferred embodiment of an electrical wrench of this invention is disposed with a housing (not shown) and is operable so as to tighten or loosen workpieces, such as wheel nuts of vehicles. The electrical wrench includes a motor 30, a transmission body 31, a swing member 33, a drive shaft 36, a wrench shaft 37, and a shoe assembly 4.

The motor 30 is a reversible motor for actuating the electrical wrench.

The transmission body 31 includes a pair of axially spaced front and rear annular members 310, 311 which confine an accommodating space 316 therebetween and which are connected to each other by means of several axial rods 315 (only one is shown). The front annular member 310 has a front axial hole 312 formed therethrough. The rear annular member 311 has a rear axial hole 313 formed therethrough and aligned with the front axial hole 312, and an annular projection 317 which projects inwardly from an inner peripheral surface of the rear annular member 311.

The swing member 33 is a substantially segmented annulus-shape body similar to that of the prior art in construction. The swing member 33 is mounted pivotally on a pivot rod 32 that extends between the front and rear annular members 310, 311 along an axis, the axis being offset and parallel to the axis of rotation of the transmission body 31. Accordingly, the swing member 33 is mounted pivotally within the accommodating space 316 about the pivot rod 32. The swing member 33 is further provided with an axially extending positioning protrusion 331 that has a circular cross section and a radially extending hole 332 formed therethrough. A diametrical cross pin 38 is inserted through the radially extending hole 332 and has two end portions projecting from two sides of the axially extending positioning protrusion 331.

The drive shaft 36 has a front end portion 361 with a space formed in an end surface thereof, and a rear end portion 362 extending through the rear axial hole 313 of the rear annular member 311 and to be connected to an output shaft 301 of the motor 30 so that the drive shaft 36 can be driven by the motor 30. A lock element 361 is sleeved fixedly on the rear end portion 362 of the drive shaft 36 so as to position the drive shaft 36 on the motor 30. The rear annular member 311 is sleeved on the drive shaft 36 and can be rotated synchronously with the drive shaft 36 so as to rotate the swing member 33. A shaft sleeve 34 is sleeved on the drive shaft 36 and is biased to press against the annular projection 317 of the rear annular member 311 by virtue of a compression spring 35 so as to further position the drive shaft 36 on the rear annular member 311 of the transmission body 31. The compression spring 35 is sleeved on the drive shaft 36 between the front end portion 361 and the shaft sleeve 34.

The wrench shaft 37 has an end portion extending through the front axial hole 312 of the front annular member 310 into the space of the front end portion 361 of the drive shaft 36, and is rotatable freely relative to the drive shaft 36. A follower member 371 is mounted securely on the wrench shaft 37 and is located within the accommodating space 316 of the transmission body 31. The swing member 33 is engageable with the follower member 371 in a known manner when the transmission body 31 is rotated to a predetermined high speed so as to actuate the wrench shaft 37, thereby tightening or loosening the workpieces according to the rotational direction of the motor 30.

Figure 6:
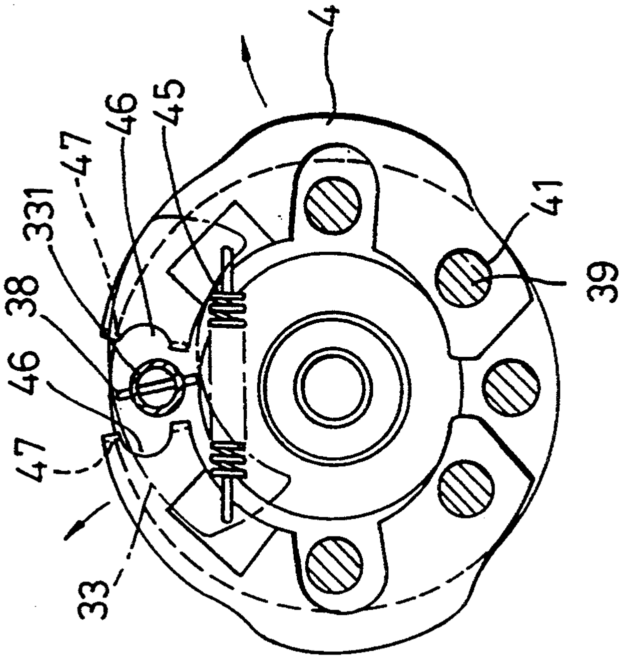
FIG. 6 is a schematic view illustrating how the shoe assembly releases the swing member to an engaging position by virtue of a centrifugal force according to this invention.
Figure 5:
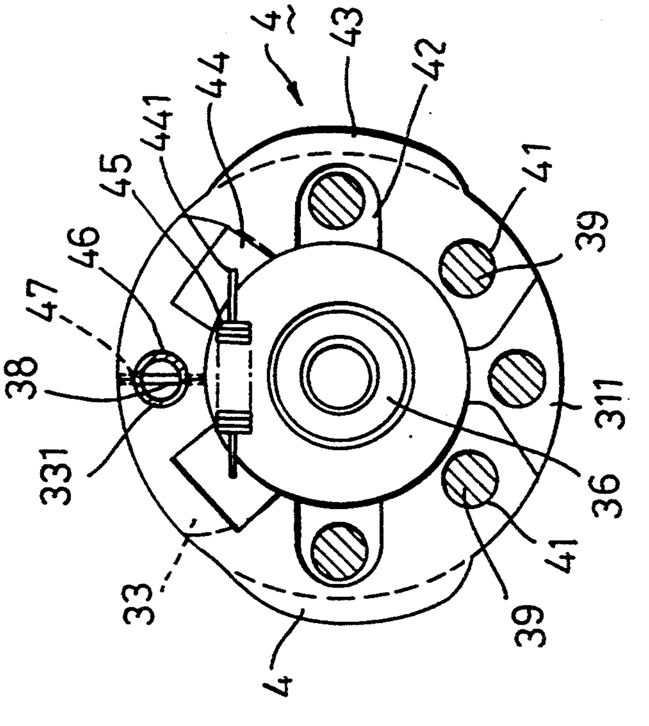
FIG. 5 is a schematic view illustrating how a shoe assembly of the electrical wrench is biased to clamp a swing member of the electrical wrench in accordance with the preferred embodiment of this invention.

The shoe assembly 4 includes a pair of shoes 40 of substantially segmented annulus-shape which extend circumferentially on two sides of the swing member 33. Each of the shoes 40 has a pivot end portion 41 which is mounted pivotally to the rear annular member 311 by means of a respective pivot pin 39 that extends through a pivot hole 411 of the pivot end portion 41 of the shoe 40 and through a respective hole 314 of the rear annular member 311. Accordingly, the shoes 40 are mounted pivotally within the accommodating space 316. The shoe assembly 4 further includes two lock elements 392 which are sleeved respectively and fixedly on the distal ends of the pivot pins 39 so as to position the pivot pins 39 on the rear annular member 311, and two springs 391 each of which being sleeved on a respective one of the pivot pins 39 between the respective shoe 40 and the rear annular member 311 so as to bias the shoes 40 away from the rear annular member 311, thereby avoiding friction between the shoes 40 and the rear annular member 311 so as to facilitate rotation of the shoes 40 relative to the rear annular member 311. Each of the shoes 40 has a clamping end portion 42 which is recessed to form a curved protrusion-clamping surface 46 and a curved pin-clamping surface 47 that cooperatively define a receiving space substantially conforming to the shape of the axially extending positioning protrusion 331 and the diametrical cross pin 38, as shown in FIG. 5. A spring 45 interconnects the shoes 40 by inserting two ends of the spring 45 into two holes 441 of two recesses 44 of the shoes 40 so as to bias the shoes 40 to a clamping position, where the clamping end portions 42 of the shoes 40 abut against each other. In this way, the curved protrusion-clamping surfaces 46 and the curved pin-clamping surfaces 47 of the shoes 40 can respectively clamp and immobilize the axially extending positioning protrusion 331 and the diametrical cross pin 38 so as to avoid engagement of the swing member 33 with the follower member 371, thereby stopping rotation of the wrench shaft 37. Each of the shoes 40 further has a circular receiving space 48 formed in an inner curved surface thereof. The receiving spaces 48 of the shoes 40 can respectively receive two opposite axial rods 315 when the shoes 40 are at the clamping position. Two weighing portions 43 are respectively formed on outer curved surfaces of the shoes 40. Accordingly, when the transmission body 31 is rotated to the predetermined high speed, the weighing portions 43, under the influence of the centrifugal force, can overcome the force of the spring 45 to allow the clamping end portions 42 of the shoes 40 to move away from each other to a predetermined distance so as to release the swing member 33 to the engaging position, as shown in FIG. 6, thereby permitting engagement of the swing member 33 with the follower member 371 so as to actuate the wrench shaft 37. The weight of the weighing portions 43 can be selectively increased or decreased according to different needs by applying some mechanical works on the weighing portions 43 so as to enhance stability of action of the shoe assembly 4 for effectively clamping or releasing the swing member 33.

Because a fewer number of elements are needed to constitute the electrical wrench of this invention, it is easy to assemble the electrical wrench and to service the electrical wrench during use. The manufacturing cost of the electrical wrench is therefore decreased. In addition, owing to a simpler construction of the shoe assembly 4, the clamping or releasing action of the shoe assembly 4 can be easily and precisely controlled.

With this invention thus explained, it is apparent that numerous modifications and variations can be made without departing from the scope and spirit of this invention. It is therefore intended that this invention be limited only as indicated in the appended claims.

I claim:

1. An electrical wrench including a motor, a drive shaft which is driven by said motor, a transmission body which is mounted on said drive shaft for rotating synchronously therewith and which has an accommodating space formed therein, a wrench shaft which has at one end thereof a follower member that extends into said accommodating space of said transmission body, and a swing member of substantially segmented annulus-shape which is mounted pivotally within said accommodating space of said transmission body about an axis that is offset and parallel to the axis of rotation of said transmission body, said swing member normally swinging to an engaging position with said follower member to transmit rotation to said wrench shaft when said transmission body is rotated to a predetermined high speed, said electrical wrench further including a shoe assembly which is biased to clamp said swing member to disengage said swing member from said follower member, said shoe assembly being capable of releasing said swing member to said engaging position by virtue of the centrifugal force induced at said predetermined high speed of said transmission body, wherein the improvement comprises:

said swing member having an axially extending positioning protrusion; and said shoe assembly including a pair of shoes of substantially segmented annulus-shape which extend circumferentially on two sides of said swing member and which respectively have one end mounted pivotally to said transmission body in said accommodating space and the other opposite end for clamping and immobilizing said axially extending positioning protrusion of said swing member.

2. An electrical wrench as claimed in claim 1, wherein said axially extending positioning protrusion of said swing member has a circular cross section, said swing member further including a diametrical cross pin which projects from two sides of said axially extending positioning protrusion.

3. An electrical wrench as claimed in claim 2, wherein said other opposite ends of said shoes are normally biased to abut against each other to their clamping positions and are recessed to cooperatively define a receiving space substantially conforming to the shape of said axially extending positioning protrusion and said diametrical cross pin.

4. An electrical wrench as claimed claim 1, wherein said transmission body comprises a pair of front and rear annular members which confine said accommodating space, and axial rods which interconnect said front and rear annular members, said swing member and said shoes being mounted pivotally to said rear annular member.

* * * * *